United States Patent
Silva Pereira et al.

(10) Patent No.: US 11,994,886 B2
(45) Date of Patent: May 28, 2024

(54) POWER SAVING IN AN EMBEDDED SYSTEM

(71) Applicant: ONiO AS, Oslo (NO)

(72) Inventors: Marco Silva Pereira, Oslo (NO); Vemund Bakken, Oslo (NO); Ronan Barzic, Oslo (NO); Somayeh Hossein Zadeh, Oslo (NO)

(73) Assignee: ONiO AS, Oslo (NO)

( * ) Notice: Subject to any disclaimer, the term of this patent is extended or adjusted under 35 U.S.C. 154(b) by 0 days.

(21) Appl. No.: 17/555,021

(22) Filed: Dec. 17, 2021

(65) Prior Publication Data

US 2023/0195149 A1 Jun. 22, 2023

(51) Int. Cl.
*G05F 1/56* (2006.01)
*G06F 1/3234* (2019.01)
*H02J 7/00* (2006.01)

(52) U.S. Cl.
CPC .............. *G05F 1/56* (2013.01); *G06F 1/3243* (2013.01); *H02J 7/0013* (2013.01)

(58) Field of Classification Search
CPC ......... G06F 1/56; G06F 1/3243; H02J 7/0013
See application file for complete search history.

(56) References Cited

U.S. PATENT DOCUMENTS

| 7,053,691 | B2 | 5/2006 | Yates et al. | |
| 2003/0018296 | A1* | 1/2003 | Riddle | A61N 1/044 604/20 |
| 2008/0192515 | A1* | 8/2008 | Huynh | H02M 3/33507 363/21.01 |
| 2011/0298431 | A1 | 12/2011 | Sander et al. | |
| 2013/0264870 | A1* | 10/2013 | Keysar | H02J 50/001 307/24 |
| 2014/0347894 | A1* | 11/2014 | Sutardja | H02M 3/335 363/21.12 |
| 2016/0109490 | A1 | 4/2016 | Diewald et al. | |
| 2016/0197508 | A1* | 7/2016 | Kruiskamp | H02J 7/0068 307/130 |
| 2017/0085174 | A1* | 3/2017 | Babazadeh | G01R 31/64 |

(Continued)

OTHER PUBLICATIONS

Norwegian Search Report in counterpart Norwegian Patent Application No. 20211534, dated Jun. 29, 2022.

(Continued)

*Primary Examiner* — Nimesh G Patel
(74) *Attorney, Agent, or Firm* — Hershkovitz & Associates, PLLC; Abe Hershkovitz (57) ABSTRACT

An embedded system comprises a circuit for executing operations, a power management unit for interfacing with at least one power source, a main storage unit for storing energy from the power source for provision to the circuit, at least one inductor for accumulating energy from the power source for transfer to the main storage unit and for accumulating energy from the main storage unit for transfer to the circuit, and a sensor circuit for monitoring a current through the at least one inductor as the energy is accumulated thereon. The power management unit is configured to connect the inductor to transfer energy to the main storage unit or to the circuit in response to a signal from the sensor circuit that peak current has been reached. Also described is a device including an embedded system and a method for operating an embedded system.

21 Claims, 3 Drawing Sheets

(56) References Cited

U.S. PATENT DOCUMENTS

| | | | |
|---|---|---|---|
| 2019/0146569 A1 | 5/2019 | Nge et al. | |
| 2019/0214906 A1 | 7/2019 | Mahmoudi et al. | |
| 2019/0305684 A1 | 10/2019 | Sonntag | |
| 2020/0313424 A1* | 10/2020 | Woo | H02J 7/00304 |
| 2021/0021193 A1 | 1/2021 | Mahmoudi et al. | |
| 2022/0037999 A1* | 2/2022 | Blyth | H02M 3/157 |
| 2022/0311336 A1* | 9/2022 | You | H02M 3/1566 |

OTHER PUBLICATIONS

Office Action in counterpart Norwegian Patent Application No. 20211534, dated Jun. 29, 2022.
Combined Search and Examination Report under Sections 17 and 18(3) in related Application No. GB2118354.6, dated Jun. 6, 2022.
International Search Report in related International Application No. PCT/NO2022/050313, mailed on Mar. 22, 2023.
Written Opinion of the International Searching Authority in related International Application No. PCT/NO2022/050313, mailed on Mar. 22, 2023.

* cited by examiner

POWER SAVING IN AN EMBEDDED SYSTEM

FIELD OF THE INVENTION

The present invention relates to an energy efficient system and to a method for power saving which is applicable to an embedded system including a microcontroller.

BACKGROUND OF THE INVENTION

The advent of the MOS transistor in the mid-1900s allowed for the development of embedded systems including microcontrollers or MCUs (microcontroller units), which over the subsequent half century became rapidly more and more powerful, and more and more compact. An embedded system generally includes a microcontroller or MCU (microcontroller unit), itself a small computer comprising at least one processor such as a microprocessor or CPU, which is usually associated with some memory in the form of RAM and/or embedded flash memory. Additional hardware in the form of peripherals (on-chip or external) may also be included. More recent incarnations of these embedded systems also often include components such as timers, serial ports, hardware for providing radio communication capabilities, universal asynchronous receiver-transmitter (UART) peripherals for communication with external devices, USB ports for communication and power supply to the chip, and/or DC/DC converters.

Microcontrollers used in embedded systems require energy to run, and this energy has traditionally been sourced from a battery or a mains power source coupled to the system-on-a-chip (SOC). Power usage is a critical issue for this type of device, and a great deal of effort has been applied in the industry to adapting both software and hardware in order to try to minimize this. Power saving adaptations can rely on the chip being configured to run in a number of different modes, so that peripherals are powered off when they are not required. This is sometimes not the ideal solution, since powering on the peripherals again after switch-off can often require additional power for configuration. The use of a standby mode is also common, where power to the CPU is cut off, but power to the RAM is maintained.

In order to complete a particular task, a set of instructions in binary code representing operations, which specify changes to the state of the circuit, need to be sent to the microcontroller and executed. To ensure that execution of the various operations on different parts of the circuit are synchronized, at least in the case of synchronous circuits, an oscillator or clock signal at a particular frequency is usually used to provide a time reference for the state changes. Circuits usually become active once or twice for each period of the signal. Changes to the state of the circuit (and specifically to the memory elements in the circuit) only occur when the circuits are active. The frequency of the clock signal applied to the circuit is thus crucial in terms of power usage, and a faster clock signal leads to greater power draw for the chip. The operating frequency of the circuit defines the basic clock rate for the CPU, and a maximum operating frequency for a circuit is determined by the propagation delay (time to complete the required changes to the state of the circuit or operations).

Microcontrollers generally require a lower voltage input than is provided by regular lithium-ion batteries, and so it is necessary to include a converter in order to step-down the voltage for supply to the MCU. This can be an expensive addition to an embedded system, and other solutions are desirable. Batteries also deplete during storage due to low-level chemical reactions continuing, and this reduces the shelf-life of any system including a battery. Companies have begun to consider the use of alternative energy sources and. to this end. have started to design SOCs which are able to interface with renewable energy sources such as RF energy sources, ambient temperature energy sources, photovoltaic (PV) cells, and the like.

Where two sources are used in tandem, the source capable of supplying the highest voltage is generally selected at any one time, and a determination of which of the sources fulfills this requirement is carried out periodically, such as every few seconds. U.S. Pat. No. A-7,053,691, for example, describes a circuit which allows for selection of one of a number of power sources. The selection is based on availability or non-availability of the various sources.

Energy drawn from the source used to power the circuit, whether this be from a renewable source interfaced with the circuit, from the mains, or from a battery, can be passed through a rectifier (in the case of an AC source) and then an inductor which in turn feeds energy to the energy consuming components of the circuit. In previous embedded systems having the capability of interfacing with one or more renewable energy sources, the inductor is charged and/or discharged based on a traditional clocked approach. The inductor is energized for a certain length of time and then will transfer energy, possibly to a capacitor, which can be utilized to perform the various tasks to be run in that clock cycle. The time period for energizing the inductor, and the time period for transfer of energy from the inductor, will depend on the clock frequency of the associated oscillator and will therefore be fixed.

If the energy input to the circuit is high, therefore, energy will be wasted once the peak current in the inductor is reached, which will be some time before transfer of energy from the inductor begins. Likewise, if the level of the energy fed to the inductor is too low, the inductor will not charge up to peak before energy begins to be transferred away from the inductor. In both cases this process is very energy inefficient. Such circuits are generally configured for peak efficiency at a particular (expected/average) input energy level, but they cannot provide efficiency over a wide range of input energies. The clock rate for the charging circuit may be tuned to the inductor or to the type of source, so that the peak current is reached at around the time that the circuit clocks. For power sources which are unpredictable, however, it is not possible to tune the circuit in this way because the energy available from the source is variable. This is a major disadvantage where renewable sources are concerned, because these in particular are often not able to provide a consistent input voltage. A large amount of energy is wasted due to the clock frequency being too fast or too slow in relation to the rate of energy accumulation on the inductor.

Prior art systems can include power management units (PMUs), but if included these are generally not integrated in the sense that they are separate from the other components of the chip and there is no two-way communication between the PMU and the voltage domain(s) or blocks of the chip. Instead, the PMU supplies power to components of the chip through switches, which are turned on when power is required to run a task, and switched off when no power is required. The CPU therefore decides whether to accept power supplied through the PMU, but there is no further control of the supply in response to information sent from the blocks on the chip.

Energy saving and efficiency in embedded systems configured to interface with one or more alternative sources of energy still requires a great deal of improvement. Although different modes of operation and the selection of one of a number of power sources to supply an SOC do go some way to reducing the power requirements of such systems, the energy usage is still a limiting factor in terms of the utility of devices including such systems. Improvements in efficiency are thus always desirable.

Brief Summary of the Invention

According to an aspect of the present invention, there is provided an embedded system comprising: a circuit for executing operations; a power management unit for interfacing with at least one power source; a main storage unit for storing energy from the power source for provision to the circuit; at least one inductor for accumulating energy from the power source for transfer to the main storage unit and/or for accumulating energy from the main storage unit for transfer to the circuit; and a sensor circuit for monitoring a current through the at least one inductor as the energy is accumulated thereon. The power management unit is configured to connect the inductor to transfer energy to the main storage unit or to the circuit in response to a signal from the sensor circuit that peak current has been reached.

A "storage cadence" can be defined as the time from initiating accumulation of energy on the inductor from a power source to the time when the inductor has been fully discharged to the main storage unit. An "operating cadence" can be defined as the time from initiating accumulation of energy on the inductor from the main storage unit to the time when the inductor has been fully discharged to the circuit. Rather than using an oscillator and a clocked circuit in the traditional sense, the length of each storage cadence or operating cadence and/or the time between initiation of consecutive cadences is self-adjusting under control of the power management unit (PMU). This is much more efficient that a traditional SOC in terms of energy usage, and means that the chip can have a more-or-less flat energy curve across a broad range (equally efficient at all energy input levels). Connecting the inductor to transfer energy to the main storage unit or to the circuit comprises causing the inductor to be connected to the main storage element or to the circuit by the adjustment of switches within the circuit to provide the desired connections.

Accumulating energy on the inductor refers to the increase in energy stored in the magnetic field produced by the inductor as the current through it increases. The power management unit may comprise or may be coupled to charge/discharge control logic, which determines whether a charging cadence or an operating cadence is initiated in each cycle. Charging cadences will generally be prioritized. The main storage unit will usually be a capacitor (although this is not a requirement) and the charge/discharge control units may be coupled to their own energy storage unit from which they draw energy, and which is separate from the main storage unit. The energy storage unit linked to the charge/discharge control unit will usually also be a capacitor, but could also be a storage unit of a different type, such as a supercapacitor or a battery. The separate storage unit for the charge/discharge control unit may be chargeable directly from the power source(s) and may serve only the charge/discharge control logic. Providing a separate storage unit for the charge/discharge control logic means that the charge/discharge control logic can always be active, even when the main storage unit is completely depleted of energy. The ability to completely discharge the main storage unit and still have a functioning system is valuable in a situation where energy is at a premium. The charge/discharge control logic is a part of the power management unit.

In some embodiments, the circuit is a digital circuit. In embodiments, the digital circuit comprises a core logic unit (or core digital domain), including a processor and a memory. An embedded system referred to herein is any computer system designed to carry out a particular function where the system comprises at least control logic associated with a memory, and usually also an interface for peripherals. The embedded system may be a system-on-a-chip (SOC), and may be produced as an integrated circuit using CMOS technology. The SOC may be formed as a contiguous piece of silicon comprising all of the elements of the system. The elements of the system include the power management unit (PMU), and will generally include each of the PMU components including the charge/discharge control logic, a core logic unit, means for connection to one or more power sources, one or more inductors for charging the main storage unit and/or domain storage units, and optionally a peripheral interface.

In some embodiments, the embedded system comprises at least one domain storage unit for providing energy to a power domain of the circuit. Transfer of energy to the circuit comprises transferring energy to one or more of the domain storage units. In other words, the system comprises means for transferring energy from the inductor to the circuit, which are configured to transfer energy to the at least one domain storage unit. The circuit may include multiple domains in some cases, with each associated with its own separate domain storage unit, usually a capacitor. To run a task controlled by that particular domain, energy from the associated domain storage unit is used. If no or insufficient energy is available at that domain storage unit, the application running the task will request energy from the charge/discharge control logic of the power management unit. It will be under control of the power management unit whether to run an operation cadence next in order to provide energy for that application, or to run a charging cadence, which will happen if it is determined that it is still necessary to collect more of the energy available from the environment.

Usually, just enough energy will be provided on the domain storage unit to run the necessary task. This may require one or more operating cadences to be executed. It may be the case that during a particular operating cadence, energy is stored on or directed to only one of the domain storage units present on the chip. Supply of energy to another domain storage unit to service another application, for example, will generally need to wait until a subsequent operating cadence is carried out. Alternatively, the system can be configured to divide energy sourced from the main storage unit to direct it to multiple domain storage units. This can be achieved by use of a fork, which splits the energy received from the inductor into multiple branches coupled to different domain storage units, or by alternating which of two or more domain storage units the energy is directed to during an operating cadence.

In other embodiments, the power management unit is configured to connect the same inductor to transfer energy to the main storage unit during a storage cadence of the system and to transfer energy to the circuit during an operating cadence of the system. The same inductor is therefore configured for transfer of energy to the main storage unit during a storage cadence of the system. and to the circuit during an operating cadence of the system. This provides an efficient and compact configuration for the circuit. It also means that either a charging cadence or an operating cadence can be run at one time, but not both. Switching between a charging and operating cadence simply means switching, under the control of the power management unit, to connect the inductor for transfer of energy either to the main storage unit (charging cadence) or the circuit (operating cadence) once the inductor is energized and peak charge has been reached.

The inductor may alternatively be used only for transfer of energy to the main storage unit from the power source, or may be used only for transfer of energy to the domain storage unit(s) (if present) from the main storage unit, with charging of the other storage unit being controlled in a conventional manner. As a further alternative, two separate inductors may be present, one used for transfer of energy to the main storage unit from the power source and the other for transfer of energy to the domain storage unit(s) from the main storage unit. In such a case, it may be possible for a charging cadence and an operating cadence to be carried out simultaneously.

In other embodiments, the power source is a renewable power source. A renewable power source is a power source configured to harvest energy from its surroundings (i.e. from an external source of energy such as the sun). Examples of suitable renewable power sources for use with the embedded system described herein are photovoltaic cells, radio frequency harvesters, piezoelectric elements, other elements configured to harvest kinetic energy, and thermal energy harvesting elements. The system may be connected or connectable to two or more renewable energy sources, and may select which to connect to the inductor at any one time based on relevant factors such as the time of day, energy currently available from each of the sources, or pre-set preferences. The system may be configured to flip-flop or alternate between sources which are able to provide above a threshold level of energy during a period of time, for example.

In yet other embodiments, the system comprises two or more power sources, and the power management unit is configured to determine which of the power sources to draw energy from at any time. The power management unit is configured to select one of the available sources from which to draw power. This selection may be updated periodically.

In further embodiments, the embedded system is a monolithic system on a chip comprising a plurality of blocks including: the power management unit and a core logic unit having a memory. Including the PMU as part of the SOC means that the whole system is compact, light, easy to transport, and cheap to produce.

In yet further embodiments, the blocks comprise a multimode RF domain having one or more radio transceivers, and a peripheral domain for interfacing with peripherals. The peripherals may be digital or analogue peripherals, or both. The peripherals may comprise one or more sensors for sensing a property of the environment, such as a heart rate sensor, a thermometer, a humidity sensor, a pressure sensor, and so on.

In some embodiments, the embedded system comprises a plurality of power domains, wherein each power domain is associated with and served by a domain storage unit. Energy is provided to each power domain by charging the associated domain storage unit from the main storage unit through the inductor. Each domain sources energy from its domain storage unit in order to run operations.

In some embodiments, the embedded system comprises a comparator coupled to the power source for comparing the energy available from the power source to a threshold. The power management unit is configured to initiate accumulation of energy from the power source on the inductor (to initiate a charging cadence) only if the energy level at the source is detected by the comparator to be equal to or greater than the threshold. There may also be a comparator associated with the main storage unit to compare the energy available on the main storage unit with a threshold. This information may be used by the power management unit to decide when a storage cadence needs to be carried out in order to store energy on the main storage unit (i.e. when the level of energy is below a threshold level), and when an operating cadence can be executed.

In other embodiments, the comparator is activated periodically to execute the comparison, and the frequency of the activation is variable under the control of the power management unit. This again minimizes power usage and maximizes efficiency. The power management unit can increase the frequency of the activations when it is likely that the threshold will be reached in the next comparison. This will reduce any time between the end of one cadence and the start of the next when sufficient energy is available, but will not waste energy in the comparison when sufficient energy is not available, or is unlikely to be available.

In yet other embodiments, the power management unit is operable to vary the frequency based on an energy level available at the power source and/or based on whether the threshold energy was reached in a preceding one or more periods. These parameters indicate the likelihood of the energy threshold being met in the subsequent comparison and are easy to measure. Using these parameters to adjust the comparator frequency can minimize wasted time between cadences where ample energy is available.

In further embodiments, the power management unit is configured to subsequently disconnect the inductor from the main storage unit or the circuit in response to a signal from the sensor circuit indicating that zero current has been reached on the inductor. This disconnection of the inductor represents the end of a cadence, and terminates transfer of energy to either the main storage unit or the circuit. The next cadence can then be initiated, and the inductor connected to either the power source or main storage unit so that the inductor is energized again until peak current is reached.

In yet further embodiments, the power management unit comprises charge/discharge control logic for controlling accumulation of energy on the inductor and transfer of energy from the inductor to the main storage unit and the circuit, and the charge/discharge control logic is served by a dedicated charge/discharge control logic storage unit. The dedicated storage unit for the charge/discharge control logic is configured so that it is possible to charge it directly from the power source, rather than from only the main storage unit as is done for the other domain storage units.

According to another aspect of the present invention, there is provided a device comprising the embedded system, the at least one power source, and a sensor coupled to the circuit for monitoring a property of the surroundings or environment. The device may be a sensing patch or device, such as a wearable device (a patch, a wristband, an item of clothing, or a device for implanting under the skin).

According to a further aspect of the present invention, there is provided a method for operating an embedded system comprising a circuit for executing operations, the method comprising: accumulating on an inductor energy from a power source for subsequent transfer to a main storage unit or energy from the main storage unit for subsequent transfer to the circuit; during accumulation of energy on the inductor, monitoring a current through the inductor by a sensor circuit to determine whether peak current through the inductor has been reached; when the peak current is detected to have been reached, sending a confirmation signal from the sensor circuit to a power management unit of the system; and, in response to the confirmation signal, connecting the inductor, by the power management unit, to transfer the energy accumulated thereon to the main storage unit or to the circuit. The connection of the inductor will directly follow receipt of the confirmation signal, i.e. there will be no waiting period between the two events and connection will occur as soon as possible after the confirmation signal is received, taking into account any inherent limitations of the system.

BRIEF DESCRIPTION OF THE FIGURES

Embodiments of the present invention will now be described, by way of example only, with reference to the following diagrams, in which.

DETAILED DESCRIPTION OF THE INVENTION

Figure 1:
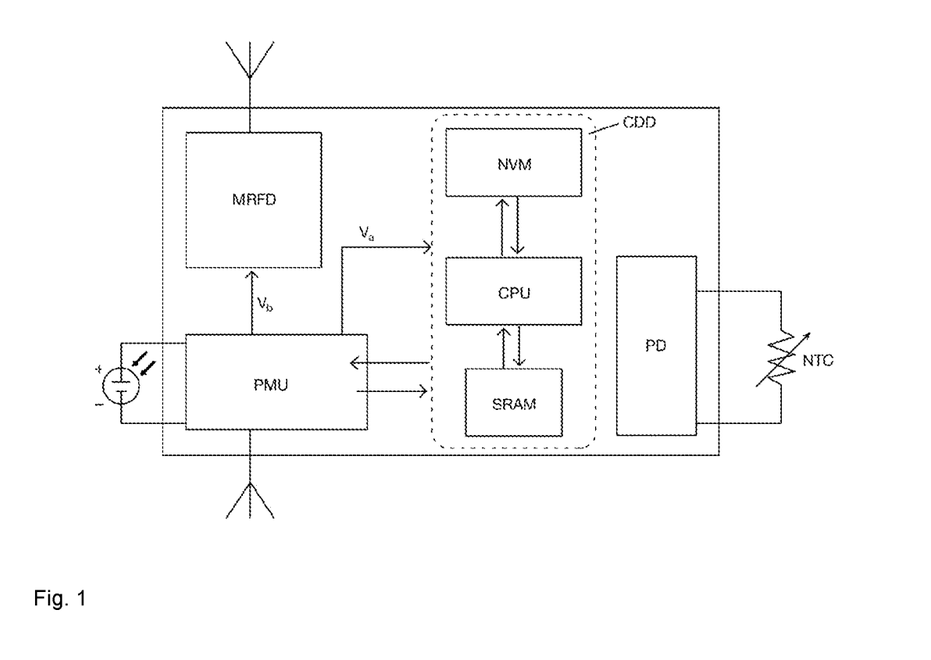
FIG. 1 illustrates an SOC including multiple blocks.

The components of an embedded system in one possible configuration are shown in FIG. 1. The embedded system is a system on a chip (SOC) comprising at least four separate blocks including a core logic unit or core digital domain (CDD), a multimode RF domain (MRFD), a peripheral domain (PD), and a power management unit (PMU). The inclusion of the PMU as part of the SOC, and the way in which it interacts with other parts of the system to control energy input, results in an extremely compact system and an efficient energy usage across a wide range of energy levels, as will be described in detail below.

The core logic unit comprises a CPU, static RAM (SRAM), and non-volatile memory (NVM). The MRFD includes at least one radio frequency transmitter or transceiver for sending and receiving data from external or internal devices. This transceiver/transmitter can implement multiple radio protocols such as Bluetooth® low energy (BTLE) and IEEE 802.15.4. The PD comprises circuitry for interfacing with external devices, which may include one or more of a temperature sensor, heart rate sensor, EEG/ECG sensor, blood pressure measuring devices, or any other biometric sensing device. The chip may also include one or more internal sensors which may comprise part of an additional block or as part of one of the existing blocks, such as the core logic unit.

The embedded system may in some cases be incorporated into a wearable device, such as a patch, band, or an item of clothing. One particularly advantageous use of the embedded system is for interfacing with a biometric sensor in a wearable patch. The patch may have an adhesive backing for attachment to the skin. The biometric sensor (i.e. a skin or core body temperature sensor) can forward sensor data to the core logic unit. This may be processed by the chip logic and certain actions may be taken in response to a reading that is detected to be above or below a threshold. Information, including sensor data or warnings, can be sent to an external device via a radio transceiver on the chip. Because the device in this case has a crucial health function, and is required to be both lightweight/wearable and reliable, power saving is particularly important. The power saving capabilities of the embedded system described herein are therefore ideally suited to this type of use. The system is also particularly suitable for use with other simple sensing devices, such as heat or humidity sensors with a communicative function.

At least a portion, and in some cases all, of the power to the chip can be provided by renewable energy sources, where a renewable energy source refers to any energy source which is operable to harvest energy from an external environmental source or from the surroundings. The external environmental source from which energy is harvested by the renewable source can be solar energy (the sun), body heat, kinetic energy, radio, and so on. The renewable source itself can be any one or more of a photovoltaic (PV) cell, a radio frequency energy harvester (an RF source), a piezoelectric element, or a thermal energy harvesting element. Selection of a source may be based on available energy from each source, or based on pre-set conditions (i.e. if energy available from more than one source is above a threshold, then selection would alternate between the different sources for consecutive storage cadences, or source energy from a preselected one of the available sources).

Any renewable source can be utilized, but a combination of at least one PV cell and at least one RF source provides a good coverage in terms of energy availability over a longer time period, and these sources are illustrated in FIG. 1. The PV cell may be able to provide less input energy at night, for example, at which time the RF source can be more heavily utilized. Because the radio frequency harvester produces an alternating current, a rectifier, such as a wideband rectifier, may be included in the path between the RF source and the rest of the system. The rectifier is capable of converting any time varying signal, i.e. between 400 MHz and 2500 MHz in the case of an RF source, and converting it to a DC voltage. Such a rectifier may be included for any renewable source linked to the chip which has alternating current as an output. The PV cell is operable to take any weak input DC voltage and to store this for subsequent provision to requesting blocks via an inductor, as described below. The rectifier, if present, will be between the source and the inductor.

Each of the power domains on the chip carries out a particular function or set of functions, and requires voltage to perform tasks associated with this function. The voltages required will depend on the specific tasks to be performed at any time, and will therefore vary based on demand. If some data needs to be sent, for example, the MRFD will require energy to prepare a packet for transmission and to send it. The MRFD will send a request for a particular voltage to the PMU, which will respond by providing voltage at the requested level on one of a number of voltage rails, each associated with its own voltage/power domain on the chip. Once the correct voltage is available on a rail, the PMU will send a message to a controller of the MRFD indicating that the requested voltage is available, at which point the MRFD can draw the voltage through the rail, and execute the required logic to prepare and send the data packet. The voltage can continue to be supplied at the requested level by the PMU until the MRFD indicates that it no longer requires energy (i.e. that the task is compete or that a task to be carried out periodically no longer needs to be carried out), at which point the PMU will adjust the switches in the circuit to stop the supply of power on the respective voltage rail.

Figure 2:
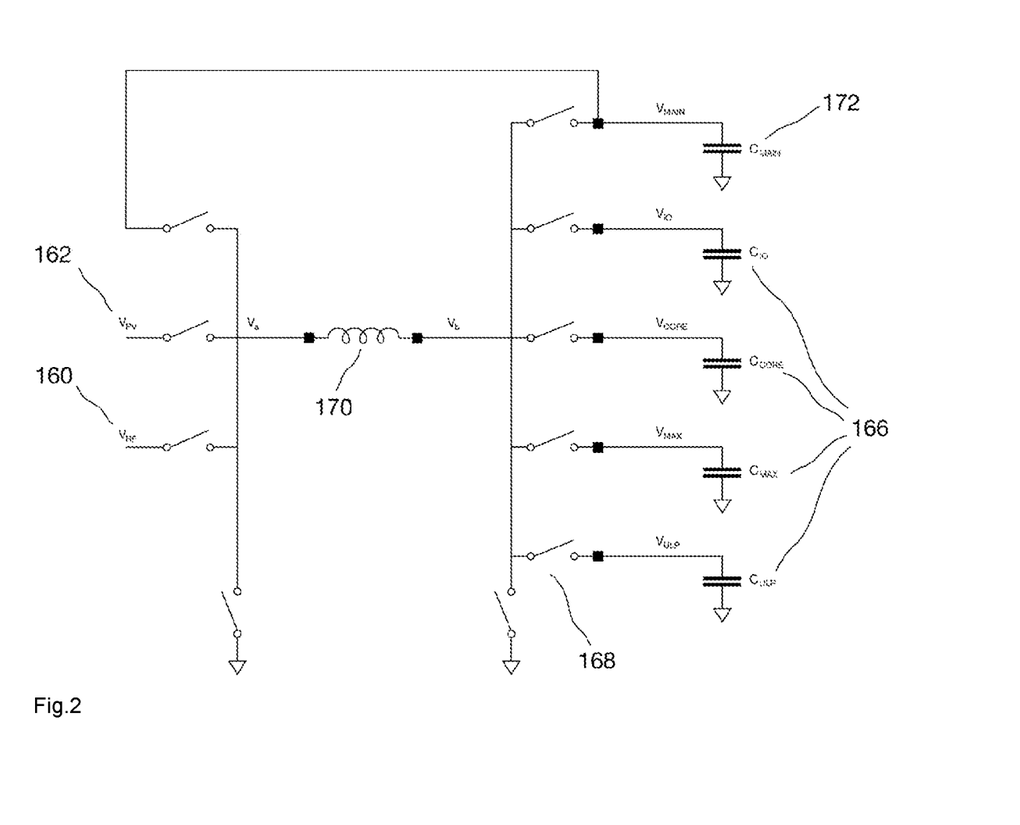
FIG. 2 is a diagram of the system including capacitors associated with the different voltage domains.
Figure 3:
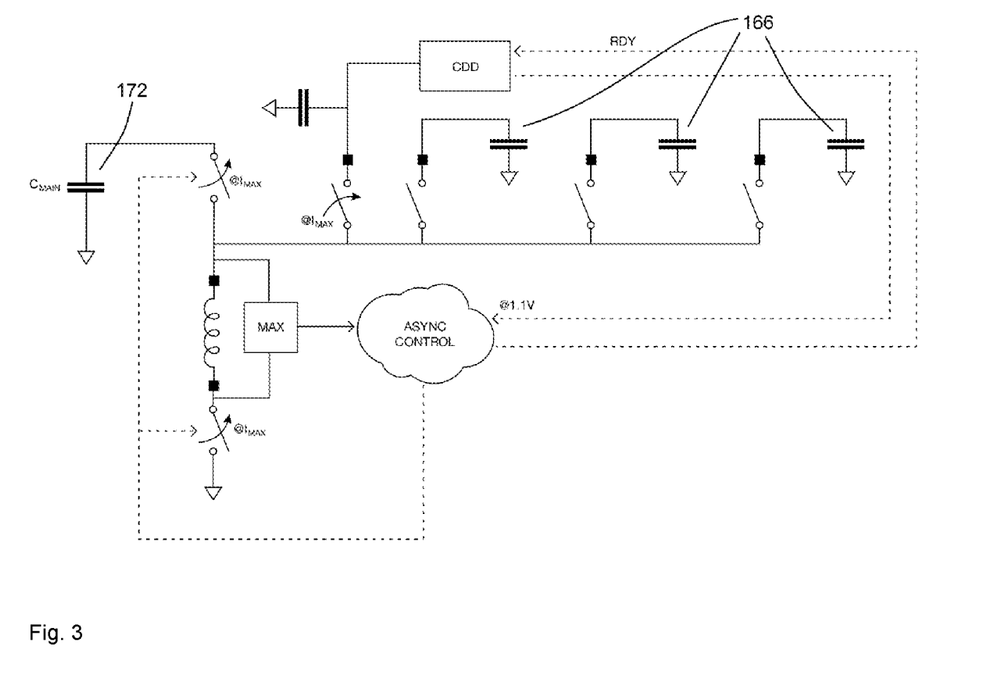
FIG. 3 illustrates the coupling between capacitors serving the voltage domains and the main capacitor.

Each of the voltage rails present can be associated with a decoupling capacitor, which each represent one of the domain storage units. Some of these domain storage units are shown in FIGS. 2 and 3 as capacitors 166. These capacitors ensure that the requested voltage can be supplied, and can continue to be supplied, on each of the rails. Capacitor 172 is the main storage capacitor for the system, which represents the main storage unit, and the PMU controls charging of this capacitor at a rate which is carefully adapted to the energy levels available from the sources providing input energy to the system. The different capacitors or storage elements representing the domain storage units can have different properties, and can thus be tailored to provide a voltage at a particular level. In such a case, the PMU will select the correct capacitor to provide the desired voltage in response to a request from a system block. Capacitors are used as the domain and main storage units here, but other energy storage mechanisms can be used in their place. Further, although one storage element (i.e. one capacitor) is allocated as each of the main storage unit and the domain storage units in the example described, two or more energy storage elements can function together as a main storage unit or as a domain storage unit.

The embedded system includes an integrated PMU, which controls the supply of energy from the renewable sources linked to the embedded system to the various voltage domains, as mentioned. The PMU comprises charge/discharge control logic, which is powered using one or more storage units that are separate from and present in addition to the main storage unit. The charge/discharge control logic storage units can be considered as a type of domain storage unit which supplies energy solely to the charge/discharge control logic and which, unlike the other domain storage units, can be charged directly from the power sources coupled to the system. The charge/discharge control logic storage units are usually powered in preference to the other storage units within the system to ensure that charging and operating cadences can always be executed, and energy can always be harvested by the system and supplied to the domains of the chip. The charge/discharge control logic storage units may be one or more additional capacitors, and the system may be configured to ensure that these do not deplete. The charge on these capacitors may not be allowed to fall below a certain fixed level, for example. Including a separate storage unit to power the charge/discharge control unit which can be charged directly from a power source, rather than only from the main storage unit as for the rest of the chip logic, means that the main storage unit can be completely discharged to the circuit if this is desirable.

As discussed above, prior art systems can include PMUs, but if included these are generally not integrated in the sense that they are separate from the other components of the chip and there is no two-way communication between the PMU and the voltage domain(s) or blocks of the chip. Instead, the PMU supplies power to components of the chip through switches, which are turned on when power is required to run a task, and switched off when no power is required. In the prior art, the CPU decides whether to accept power supplied through the PMU, but there is no further control by the PMU of the supply in response to information sent from the blocks on the chip. This communication or interoperation between the PMU and the other components of the chip is important in terms of achieving optimum energy efficiency.

When the system is initially switched on, the first priority will be to provide energy to the capacitor dedicated to (allocated specifically to provide energy only to) the charge/discharge control logic storage unit. This will be carried out first as a default, and will continue until a threshold level of energy on the charge/discharge control logic storage unit is reached. At this point, the CPU can be switched on, requests for energy will be sent from the CPU to the PMU, and the charge/discharge control logic will start to operate to prioritize tasks and to guide the execution of storage and operating cadences. The PMU will receive requests through the CPU from applications on the chip, which will either request energy for a single task to be executed as soon as possible, an ongoing task to be continued until an indication is received from the CPU that this can be discontinued, or will request energy at particular times for tasks which need to be carried out periodically (such as the sending of data every 30 minutes, for example). The charge/discharge control logic will attempt to meet these requests by providing energy to the correct domain storage units at the correct times, but will monitor the state of charge on the main storage unit at the same time to ensure that collection of energy from the power sources coupled to the system is prioritized.

Each of the voltage domains on the chip can serve logic blocks configured to execute specific operations. A scheduler, which is part of the CPU in the core logic unit, sends tasks or operations for execution by the logic blocks according to the order in which they need to be carried out. There may be one scheduler (and/or one controller) associated with each domain, a single scheduler for all domains, or a number of schedulers one or more of which can be associated with more than one voltage domain. The system may operate on a priority basis, by sorting tasks according to priority, and providing energy preferentially to those tasks which are higher up in the ranking.

An overview of components controlling the supply of energy to the different voltage domains is shown in FIG. 2. The system in this case draws power from two separate renewable energy sources of different types. Any number of sources can be coupled to the system, however, and these can be of the same or of a different type. A traditional battery can be included, for example, for use in conditions which are unfavourable for operation of the renewable sources. Here, the sources comprise one or more photovoltaic cells ($V_{PV}$; 162) and one or more radio frequency energy harvesters ($V_{RF}$; 160). These renewable sources are coupled to the rest of the circuit via switches, as shown. An additional switch couples each of the sources to a main or master capacitor 172 ($C_{MAIN}$) via a voltage rail $V_{MAIN}$. An inductor 170 is included in the circuit between the energy sources and capacitor, and this is used for voltage boosting to the main capacitor 172. The same inductor can also be used for voltage boosting to additional capacitors 166, which make up the domain storage in this case. The additional capacitors are linked to separate voltage rails and are used to ensure that the correct voltage can be supplied on each of the rails when required. The voltage level to which the capacitors in the circuit are charged can be controlled by switches 168 associated with each capacitor. Once a particular charge level on the capacitor is reached, for example, the switch is opened to prevent further charging. Control of the switches is by the PMU, as will be further described below.

The system shown in FIG. 2 includes a domain storage unit or capacitor ($C_{MAX}$) which prevents leakage from the switches of the circuit. It is important that enough energy be present to effectively turn switches on and off. This is true, for example, for the switches coupling the inductor to the domain storage units or to the main storage unit for charging. Charging of the capacitor providing energy for switching is therefore generally prioritized by the charge/discharge control logic. Other domain storage units shown in FIG. 2 include $C_{CORE}$, which provides energy to the CPU and the peripheral interface(s) and $C_{IO}$ which is operable to set input and output voltages for the circuit. These domain storage units are generally configured to be charged up only from the main storage unit. $C_{ULP}$ is the dedicated storage unit for the charge/discharge control logic, and can be considered as a domain storage unit if it is chargeable from the main storage unit. $C_{ULP}$, however, in contrast to the other domain storage units, can also be charged directly from the power source, and this is done when the circuit is initially switched on in order to get the charge/discharge control unit operational.

Figure 4:
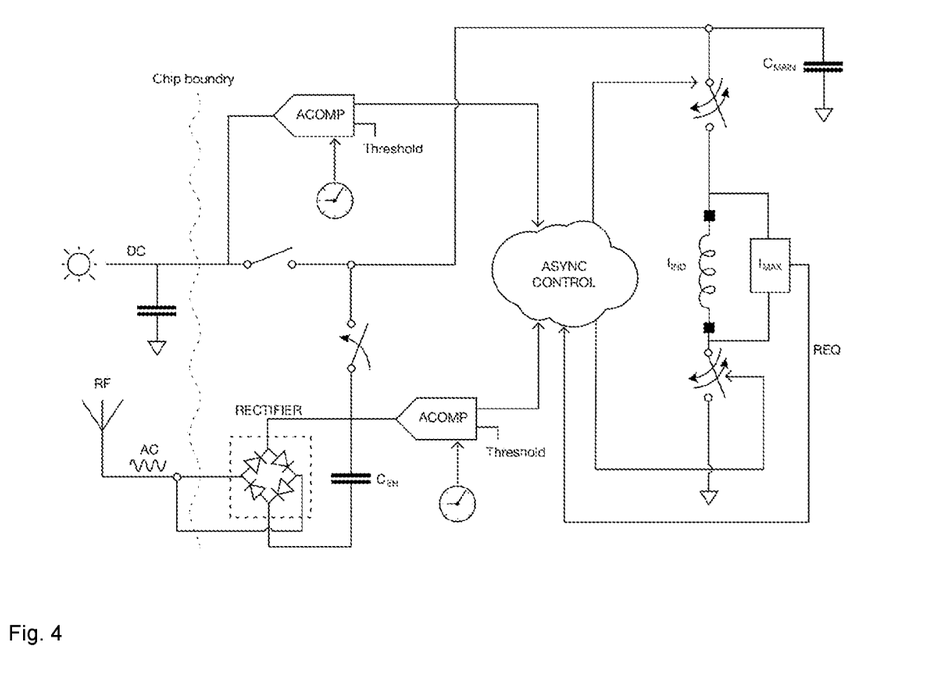
FIG. 4 shows the interaction between AC comparators and energy sources in an embedded system.

The circuit can operate in at least two modes, a charging mode and an operating mode. During the charging mode, energy from one or more of the renewable sources is stored on the main capacitor, and during the operating mode, energy from the main capacitor is used to charge additional capacitors serving the voltage domains on the chip. As shown in FIG. 4, each of the sources is associated with an analogue comparator (ACOMP) which compares the energy available from the source to a threshold energy level. If the threshold energy level is met or exceeded, asynchronous logic associated with the PMU is triggered, and the process of charging the main storage capacitor 172 begins. The threshold may be pre-determined, or may be adaptable either manually to configure the chip or by the PMU in some cases. If more than the threshold level of energy is available from more than one source, the selection of a source for transfer of energy to the inductor during the next storage cadence may be based on pre-set parameters. Sources may be ordered according to priority by the PMU, for example, or the system may alternate between the two or more available sources for consecutive storage cadences.

One novel feature of the system which helps to make the high level of energy efficiency possible is that, rather than continuously comparing at a particular frequency, the frequency with which these comparators perform the checking step is variable. This opens up the option of providing feedback to adapt the time period between comparisons. Each of the comparators is coupled to an oscillator, usually an oscillator requiring an extremely low energy to run such as a nanowatt oscillator, which is under the control of the PMU. The frequency of the oscillator signal can be adjusted based on the level of energy input from the associated source. Where the input energy levels are low, and are less likely to meet the threshold requirement at the next comparison, the frequency of the oscillator signal can be decreased, so that the comparator is operated less often to perform the threshold comparison, and energy usage is reduced.

When the comparator detects that the voltage from its associated source has reached the threshold level, asynchronous logic in the PMU, which is the charge/discharge control logic, is triggered. If a storage cadence is to be run, then the input voltage from the source (or another source which can provide energy above a threshold level) is connected to the inductor 170 by configuring switches in the circuit to run current from the source, through the inductor, to ground. This is under the control of the charge/discharge control logic of the PMU. The inductor is associated with a sensor package made up of at least one sensor, in communication with the PMU, which measures the current across the inductor as this increases (or which measures an equivalent quantity). This measurement of the current will preferably be a continuous measurement but can also be periodic with a fairly short period (i.e. a frequency in the KHz range, up to around 1 MHz). This frequency can be adaptable based on the availability of external energy. When the current through the inductor reaches a maximum or threshold level, referred to as "peak current", the charge/discharge control logic in the PMU is again triggered, this time to open the switch to ground and close a switch coupling the inductor to the main storage unit ($C_{MAIN}$). The inductor is then connected up to transfer energy to the main storage unit, which in this case is a capacitor. The same or a different sensor (i.e. a sensor measuring voltage or current) within the sensor package and associated with the inductor detects when zero current is again reached (inductor fully de-energized). Once zero current is reached, the system can remain in an idle state (switches for coupling the inductor to ground closed, switches for coupling the inductor to the sources and main storage capacitor open), awaiting operation of the PMU to start the next cycle. If the next cycle is a storage cadence, this will begin by again adjusting the configuration of the switches to run a current through the inductor from the source to begin to re-energize it.

The full cycle described above from the time when the PMU initiates accumulation of energy on the inductor after a threshold level of energy is detected at the source to zero current being reached on the inductor (detect threshold current—start energizing inductor—monitor current across inductor—detect "peak current" reached—operate switches to de-energize the inductor to the main storage capacitor — detect "zero current" reached) can be referred to as a cadence, or in this case, a "storage cadence". The storage cadence may end when the current across the inductor reaches zero. The energy on the inductor will then have been transferred to the main capacitor, which may have a capacity large enough to store energy from a plurality of storage cadences without depletion. After a storage cadence, therefore, the charge on the main capacitor will have increased.

Connection of the inductor between the source and ground to energize the inductor may be dependent on the comparator connected with that source again detecting that the threshold level has been met or exceeded. The start of each storage cadence (and therefore the time period between de-energizing of the inductor and the subsequent connection between the source and ground) may therefore depend on when the comparator next checks the voltage level from the source. The length of the cadence will also depend on the speed at which the inductor can be energized, which will itself depend on the energy input by the source. The cadence is therefore self-adjustable based on feedback received by the PMU, which is a huge advantage compared to prior art systems using a traditional oscillator signal at a particular frequency to start the discharge process for the inductor. Traditional circuits of this type are very efficient in a situation where the time to charge the inductor is similar to the time period of the oscillator signal, and display a peak in the efficiency curve at the specific level of input energy required to achieve this. However, at other energy input levels they become much less efficient. This is because the inductor reaches peak charge either too soon, in which case energy is wasted, or does not reach peak charge before transfer of energy away from the inductor begins, in which case charging of the capacitor in the circuit is not optimized.

The oscillator coupled to each of the comparators can be adapted by an instruction from the PMU to increase the frequency of the oscillator signal if the threshold level is being consistently met (i.e. energy levels from the source are high) and to decrease the frequency if the threshold is not being consistently met. The frequency may be increased by a fixed amount, for example, if for the last three periods the threshold energy level was met. The number of periods checked may be between 1 and 20, preferably between 2 and 10, and most preferably 3 to 5. The frequency may be decreased if, for each of the checked duty cycles, the threshold energy level was not met. Because the frequency of the oscillator coupled to each comparator is configured to vary based on how often the threshold is being met, the start of the cadence will not be delayed in a case where ample energy is available. This will tend to reduce the time period between the start of each cadence in a situation where a high level of energy is available from the source.

Although usually a simple comparator will be used, which is only able to determine whether the energy level has or has not reached a threshold, in some cases an actual energy level may be determined such as by using an analogue-digital convertor in place of the comparator. Alternatively, two or more separate comparators, each detecting when an energy level at the source exceeds a different threshold, can be included. In the latter two examples, the frequency of the oscillator signal controlling the comparators and/or A-D convertors can be increased when the threshold is approached if desired. This can be based on an additional threshold, for example, which is lower than the energy threshold for activation of the asynchronous logic. When this additional threshold is reached, the frequency of the oscillator signal can be increased, and thus the period between comparisons carried out by the comparator is shortened to trigger the logic as close as possible to the time at which the threshold energy becomes available.

For this type of cadence, the PMU may also, before configuring the switches to charge up the inductor and after selecting a storage cadence as the next cadence, select one of the two or more energy sources with which to charge the main capacitor. This decision may be based on which of the sources triggered the logic (i.e. which is detected to be able to supply at least the threshold voltage level). If the energy level at both sources is above the threshold, then the decision may be based on alternative factors, such as which source is likely to be able to keep supplying energy for the longest, or which source is able to provide the highest voltage level. Sources may also be alternated or ordered according to priority as described above. If a priority list is used, this can be worked down to find the highest listed source with energy available above the threshold. Generally, the threshold energy level will be the same for each source, but it may be different.

Figure 5:
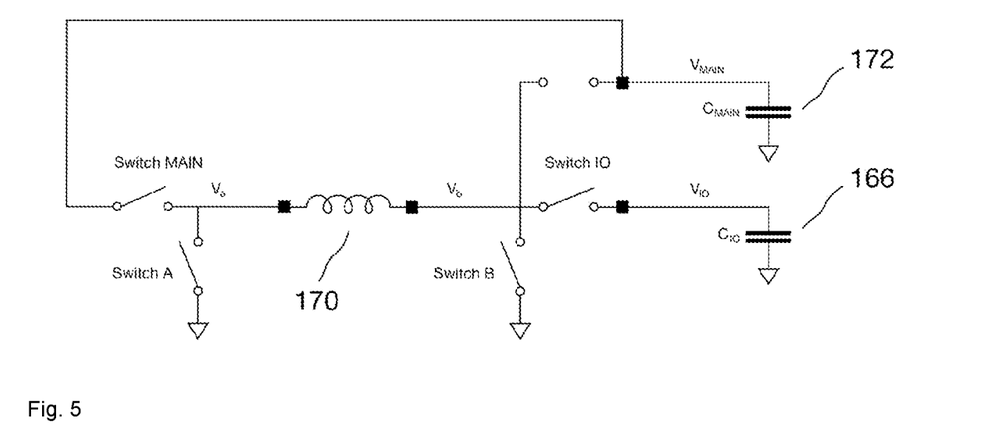
FIG. 5 illustrates components of the system used for charging a domain storage capacitor $C_{IO}$.

The operating mode works very similarly to the storage mode but, rather than energizing the inductor using energy from the source, the inductor is energized from the main capacitor and discharged to the circuit (which may be to one or more of the domain capacitors used to provide a voltage to the voltage domains). This is illustrated in FIG. 5, which shows the components of the circuit coupling the main capacitor $C_{MAIN}$ to a domain capacitor $C_{IO}$ through the inductor. The capacitor $C_{IO}$ is selected as an example, but obviously a similar process can be followed to transfer energy to the other domain storage capacitors in the system. At the start of each cadence in the operating mode (referred to as an "operating cadence"), the PMU again causes the inductor to be energized, this time by controlling the switches in the circuit to run a current from the main capacitor through the inductor to ground. This is achieved in the example shown in FIG. 5 by closing switch B to ground and switch MAIN to the main capacitor, while switches A and IO are open. When peak current is detected on the inductor, the state of the switches is again changed (in this case switches B and MAIN are opened and switch IO and A are closed), to discharge the current from the inductor to the domain capacitor $C_{IO}$. This state of the circuit is maintained until zero current is again detected on the inductor, at which point the system switches to idle mode (switches A and B closed, switches MAIN and IO open).

The full cycle, from the time at which the cadence begins and the inductor begins to be charged up using energy stored on the main capacitor to the point at which zero current is detected on the inductor (start energizing inductor using the main storage capacitor—monitor current across inductor— detect "peak current" reached—operate switches to transfer energy on the inductor to the domain storage capacitor— detect "zero current" reached) can be referred to as a cadence, or in this case, an "operating cadence". The operating cadence, as for the storage cadence above, may end when the current across the inductor reaches zero. Again, as for the storage cadence, initiation of the operating cadence may depend on analogue comparators detecting a threshold energy level being reached on the main capacitor in order for the asynchronous logic to be triggered.

Once the logic has been triggered, the PMU may make a determination as to whether the next cadence will be a storage cadence or an operating cadence. This may depend on the availability of energy from the source and requirements for voltage from the blocks of the chip. If no requests for a voltage have been sent by any of the blocks (the CDD for example), then a storage cadence may be executed next. If there is a pending request for a voltage, however, and this cannot be met by energy already stored on the domain storage capacitors, then an operating cadence may be executed next. Whether to execute an operating or storage cadence next may also depend on pre-set preferences, which may adapt in response to external parameters, may be manually configurable, or may remain fixed. Every integral number of cadences, where the integral number is between 2 and 20, preferably between 3 and 10 (such as every or $3^{rd}$, $4^{th}$, $5^{th}$, and $6^{th}$ cadence) may be an operating cadence, for example, at least at the initial stages of operation. These preferences may be able to be overridden in some cases, such as in the event of an urgent request for more energy from an application which needs to execute. The activity of the system may also be used to adapt the relative frequency of the operating and storage cadences.

As shown in FIGS. 2 and 3, there are a number of additional capacitors operable to provide a voltage on different rails, and more than one of these may need to be charged during a single cadence to provide a requested voltage to one or more of the domains on the chip. In the example shown, four additional capacitors ($C_{IO}$, $C_{CORE}$, $C_{MAX}$, and $C_{ULP}$) are present on four voltage rails. However, there may be many more voltage rails, each associated with an additional capacitor for decoupling in order to provide the correct voltage to the rail. During an operating cadence or several consecutive operating cadences, the switch to one of the additional capacitors is closed, under control of the PMU, so that energy is supplied to that capacitor. Once a capacitor has been charged up to the voltage level requested by one of the domains, the PMU informs that domain that the voltage requested is available on one of the voltage rails (and may control switches within the circuit to connect the voltage domain to that rail). The voltage domain then sources the required voltage and executes the task.

The system can continue recharging the domain storage unit to the desired level at least until the voltage domain informs the PMU that the requirement for a voltage no longer applies if the task is to be carried out repeatedly or continuously. If a task needs to be executed only once, one or more operating cadences may be executed to provide the required amount of energy just for that single execution of the task. Requests for energy to execute a task that needs to be carried out periodically may instead result in the scheduling of operating cadences at particular times. A request for energy once a day, or every hour, for example, will result in an operating cadence being scheduled to provide energy at the required level to the requesting voltage domain at the specified times.

In a case where no voltage has been requested (i.e. no tasks need to be completed). and the threshold energy level is not being met by either of the input sources, the system can operate in its idle mode (switches A and B in FIG. 3 closed, other switches open, sensor or sensors associated with the inductor not operating). Minimum energy is used in this mode. Once a request is again sent to the PMU, or the threshold energy level is again met, a new cadence will start.

The cadence, whether it is a storage cadence or an operating cadence, continues until the inductor has reached peak charge and has subsequently transferred energy away either to charge the main capacitor (storage cadence) or the domain storage capacitors (operating cadence). The time taken to energize the inductor to reach its peak charge will depend on the input voltage from the source in the case of a storage cadence. The cadence will proceed more slowly, and will be longer, if the energy level provided from the one or more sources is low, and will proceed more quickly if the energy level from the one or more sources is high. The only upper limit on how fast the process can run is set by the inherent logic speed of the process itself, and in these ways the control loop differs from the traditional clocked logic. The fact that no clock source is required for this purpose means that the quiescent energy can be extremely low compared to a traditional approach.

As mentioned, in a case where only one inductor is associated with the circuit, at the start (or end) of each cadence, the PMU makes a decision as to whether, for this (or the next) cadence, the system will operate in the storage mode or the operating mode, and adjusts switches accordingly. If a number of requests for a particular voltage level have been received from the various voltage domains on the chip, the PMU may cause the next cadence to be carried out in operating mode in order to serve these requests. If a high level of input energy is detected from the sources, the PMU may cause the next cadence to be carried out in charging mode to store this energy on the main capacitor. The decision may be based on many factors, among them energy input levels from the sources over the time period just passed, expected input energy from the sources in a time period to come, type and number of requests from the voltage domains, default settings, and so on. In some cases, a separate inductor can be provided to boost energy from the source for storage on the main capacitor and to boost energy from the main capacitor for charging of the additional capacitors. In such a case, these processes can proceed separately with their own cadences, and can proceed at different speeds.

Operations are run by routing voltage to the requesting domain and informing that domain that the requested voltage rail is available (at which point the relevant tasks will be executed) and storage by controlling switches to discharge the inductor to a main capacitor to store energy. Unlike a typical circuit, however, the length of each cadence is self-adjusting and can vary from one cadence to the next. The mechanism by which this is achieved is by way of feedback from a current sensor associated with the inductor forming part of the circuit, and/or from comparators associated with the renewable energy sources configured to provide power to the circuit. This provides a very fine level of control of the energy usage by the system and results in an extremely energy efficient device overall.

There may be two current sensors present to detect peak current through the inductor and zero current respectively. These may both be switched off in the idle state of the system (under control of the PMU), the peak current detector may be switched on whenever the inductor is charging, and the zero current detector may be switched on whenever the inductor is in the process of being de-energized and is transferring energy to the main storage unit or to the domain storage unit(s).

The decision as to whether to execute a charging cadence or an operating cadence taken by the PMU may be based on pre-configured parameters, or may be adjustable or self-adjusting. In one example, one in every whole number of cadences is an operating cadence. If the whole number is more than two then priority is given to charging the main storage unit.

The frequency of operating cadences may be increased at certain times of day, if less energy is available from the sources, or if an application of one of the power domains on the chip requests energy urgently.

The threshold energy level required to be met before a storage cadence begins will usually depend on the source type, but can also be configurable, or variable based on external factors, such as the time of day, previous operation of the system, and so on.

The invention claimed is:

1. An embedded system comprising:
   an operations circuit for executing operations;
   a power management unit (PMU) for interfacing with at least one power source;
   a main storage unit for storing energy from the power source for provision to the operations circuit;
   at least one inductor for at least one of (a) accumulating energy from the power source for transfer to the main storage unit and (b) accumulating energy from the main storage unit for transfer to the operations circuit;
   a sensor circuit for monitoring a current through the at least one inductor as the energy is accumulated thereon,
   wherein the power management unit comprises a connector for connecting to the at least one inductor to transfer energy to one of, the main storage unit or the operations circuit in response to a signal from the sensor circuit that peak current has been reached, wherein the peak current comprises a maximum current in the at least one inductor corresponding to one of, the energy input from the power source or the main storage unit;
   wherein the power management unit is configured to cause disconnection of the at least one inductor from the main storage unit or the operations circuit in response to a signal from the sensor circuit indicating that zero current has been reached on the at least one inductor;
   wherein the power management unit is configured to cause connection of the at least one inductor to the power source or main storage unit so that the at least one inductor is energized until peak current is reached; and
   wherein the peak is the maximum possible current on the at least one inductor.

2. The embedded system according to claim 1, comprising at least one domain storage unit for providing energy to a power domain of the operations circuit, wherein transfer of energy to the operations circuit comprises transferring energy to one or more domain storage units.

3. The embedded system according to claim 1, wherein the power management unit is configured to connect the same at least one inductor to transfer energy to the main storage unit during a storage cadence of the system, and to transfer energy to the operations circuit during an operating cadence of the system, and the cadences are self-adjusting under control of the power management unit.

4. The embedded system according to claim 1, wherein the at least one power source is a renewable power source.

5. The embedded system according to claim 1, comprising two or more power sources, wherein the power management unit is configured to determine which of the power sources to draw energy from at any time.

6. The embedded system according to claim 1, wherein the embedded system is a monolithic system on a chip (SOC) comprising a plurality of blocks including the power management unit and a core logic unit having a memory.

7. The embedded system according to claim 6, wherein the blocks comprise a multimode RF domain (MRFD) having one or more radio transceivers, and a peripheral domain for interfacing with peripherals.

8. The embedded system according to claim 2, comprising a plurality of power domains, wherein each power domain is associated with and served by a domain storage unit, and wherein energy is provided to each power domain by charging the associated domain storage unit from the main storage unit through the inductor.

9. The embedded system according to claim 1, comprising a comparator coupled to the power source for comparing the energy available from the power source to a threshold, wherein the power management unit is configured to initiate accumulation of energy from the power source on the inductor only if the energy level at the source is detected by the comparator to be equal to or greater than the threshold.

10. The embedded system according to claim 9, wherein the comparator is configured to be activated periodically to execute a comparison, and wherein the frequency of the periodic activation is variable under the control of the power management unit.

11. The embedded system according to claim 10, wherein the power management unit is operable to vary the frequency of the periodic activation charge/discharge control logic based on at least one of, (a) an energy level available at the power source and (b) whether the threshold energy was reached in a preceding one or more periodic activations of the comparator.

12. The embedded system according to claim 1, wherein the power management unit is configured to subsequently disconnect the inductor from one of, the main storage unit or the operations circuit in response to a signal from the sensor circuit indicating that zero current has been reached on the inductor.

13. The embedded system according to claim 1, wherein the power management unit comprises charge/discharge control logic for at least one of, (a) controlling accumulation of energy on the inductor and (b) transfer of energy from the inductor to the main storage unit and the operations circuit, and wherein the charge/discharge control logic is served by at least one dedicated charge/discharge control logic storage unit adapted to charge directly from the at least one power source.

14. A device comprising
an operations circuit for executing operations;
a power management unit (PMU) for interfacing with at least one power source;
a main storage unit for storing energy from the power source for provision to the operations circuit;
at least one inductor for accumulating energy from the power source for at least one of, (a) transfer to the main storage unit and (b) accumulating energy from the main storage unit for transfer to the operations circuit; and
a sensor circuit for monitoring a current through the at least one inductor as the energy is accumulated thereon,
wherein the power management unit is configured to connect the at least one inductor to transfer energy to one of, the main storage unit or the operations circuit in response to a signal from the sensor circuit that peak current has been reached,
wherein the peak is the maximum possible current on the at least one inductor;
wherein the power management unit is configured to cause disconnection of the at least one inductor from the main storage unit or the operations circuit in response to a signal from the sensor circuit indicating that zero current has been reached on the at least one inductor;
the at least one power source, and a sensor coupled to the operations circuit for monitoring a property of its surroundings.

15. A method for operating an embedded system comprising an operations circuit for executing operations, the method comprising:
accumulating in an at least one inductor, energy from a power source for subsequent transfer to a main storage unit or energy from the main storage unit for subsequent transfer to the operations circuit;
during accumulation of energy in the at least one inductor, monitoring a current through the inductor by a sensor circuit to determine whether peak current through the inductor has been reached, wherein the peak current comprises a maximum current in the inductor corresponding to the energy input from one of, the power source or the main storage unit;
when the peak current is detected to have been reached, sending a confirmation signal from the sensor circuit to a power management unit of the system; and
transferring by way of a connector, the energy accumulated in the inductor to one of, the main storage unit or the operations circuit in response to the confirmation signal; and
connecting the inductor, by the power management unit, to transfer the energy accumulated therein to one of, the main storage unit or the circuit,
disconnecting the at least one inductor from the main storage unit or the operations circuit in response to a signal from the sensor circuit indicating that zero current has been reached on the at least one inductor.

16. The embedded system according to claim 2, wherein the power management unit is configured to connect the same at least one inductor to transfer energy to the main storage unit during a storage cadence of the system and to transfer energy to the operations circuit during an operating cadence of the system, and the length of each storage cadence and operating cadence, and the time between initiation of consecutive cadences, are self-adjusting under control of the power management unit with no clock source.

17. The embedded system according to claim 2, wherein the at least one power source is a renewable power source.

18. The embedded system according to claim 5, wherein the two or more power sources are renewable power sources.

19. The embedded system according to claim 16, wherein the at least one power source is a renewable power source charge/discharge.

20. The embedded system according to claim 2, comprising two or more power sources, wherein the power management unit is configured to determine which of the power sources to draw energy from at any time.

21. The embedded system according to claim 13, wherein the system is configured to power the at least one dedicated charge/discharge control logic storage unit before any other storage unit so it does not fall below a certain fixed level to ensure charging and operating cadences can always be executed, and energy can always be harvested by the system and supplied to the power domains, and whereby the main storage unit can be completely discharged to the operations circuit.

* * * * *